United States Patent

Harris et al.

(10) Patent No.: US 8,561,169 B2
(45) Date of Patent: Oct. 15, 2013

(54) DATA PROCESSING APPARATUS AND METHOD FOR MANAGING ACCESS TO A DISPLAY BUFFER

(75) Inventors: Peter William Harris, Cambridge (GB);
Peter Brian Wilson, Cambridge (GB);
David Paul Martin, Cambridge (GB);
Timothy Charles Thornton, Reading (GB)

(73) Assignee: ARM Limited, Cambridge (GB)

( * ) Notice: Subject to any disclaimer, the term of this patent is extended or adjusted under 35 U.S.C. 154(b) by 1712 days.

(21) Appl. No.: 11/987,903

(22) Filed: Dec. 5, 2007

(65) Prior Publication Data

US 2008/0163368 A1     Jul. 3, 2008

(30) Foreign Application Priority Data

Jan. 3, 2007   (GB) .................................. 0700068.0

(51) Int. Cl.
    *G06F 21/00*   (2013.01)
(52) U.S. Cl.
    USPC ........................................... 726/17; 713/166
(58) Field of Classification Search
    USPC .................................................... 726/17, 21
    See application file for complete search history.

(56) References Cited

U.S. PATENT DOCUMENTS

2004/0179019 A1* 9/2004 Sabella et al. ................ 345/537
2005/0246773 A1* 11/2005 Draine et al. .................. 726/22

FOREIGN PATENT DOCUMENTS

| GB | 2 396 713 |   | 6/2004 |
| GB | 2 396 930 |   | 7/2004 |
| GB | 2396930   | * | 7/2004 |
| GB | 2 406 403 |   | 3/2005 |
| GB | 2406403   | * | 3/2006 |

OTHER PUBLICATIONS

International Search Report for GB 0700068.0 mailed May 1, 2007.

* cited by examiner

*Primary Examiner* — Gilberto Barron, Jr.
*Assistant Examiner* — Devin Almeida
(74) *Attorney, Agent, or Firm* — Nixon & Vanderhye P.C.

(57) ABSTRACT

A data processing apparatus and method are provided for managing access to a display buffer. The data processing apparatus has a display buffer for storing an array of display elements for subsequent output to a display controller, with each display element having a security permission indication associated therewith identifying whether that display element is a secure display element or a non-secure display element. At least one processing unit is provided for executing a non-secure process and a secure process, each process issuing access requests when seeking to access display elements in the display buffer, and each access request specifying a location in the display buffer. Interface logic is associated with the display buffer for receiving each access request and is arranged for at least each access request issued by the non-secure process to determine the security permission indication associated with the display element currently stored at the location specified by that access request. Based on the security permission indication, the interface logic then determines how that access request should be processed. Accordingly, the interface logic can selectively prevent access to secure display elements by the non-secure process, so as to protect the security of secure display elements contained within the display buffer.

20 Claims, 9 Drawing Sheets

DETERMINE AND SET PERMISSION STATUS

DATA PROCESSING APPARATUS AND METHOD FOR MANAGING ACCESS TO A DISPLAY BUFFER

TECHNICAL FIELD

The technology relates to a data processing apparatus and method for managing access to a display buffer.

SUMMARY

Display data providers are often keen to take steps to protect certain valued display data from unauthorised modification (resulting in loss of integrity), or unauthorised copying and/or distribution (resulting in loss of confidentiality). For example, providers of content such as films, images, etc often distribute that data in an encoded form, such that only authorised users with an appropriate decoder, and rights (permissions) to decode, can access that data. For the purposes of the following description, data which is considered valuable/confidential by the data provider, and for which it is hence desired to inhibit unauthorised modification, copying and/or distribution, will be referred to herein as "secure data", as contrasted with "non-secure data" which will be used to refer to data which is not subjected to such constraints. Similarly, the terms "secure display element" and "non-secure display element" will be used to refer to the individual components of secure data and non-secure data, respectively.

Apparatus used to decode and output secure data may also be used to handle and output non-secure data, and often this may require both secure data and non-secure data to be merged into a single output data stream for display on a single display. Such a display that is required to display both secure and non-secure data simultaneously will be referred to herein as a "securable display". Considering as an example a computer system, it may be desired to display non-secure data in the form of a graphical user interface, whilst within a particular window of that graphical user interface it is desired to display secure data, such as a film or a sequence of images. Merging of such secure and non-secure data in order to produce an output data stream for display can be performed by software within the computer system, and will typically result in the merged data being placed in a frame store, from where it will then be read by a display controller in order to generate the necessary signals to the display device.

Two particular problems arise with such an approach. Firstly, considering the security issue, it can be seen the secure data has been decoded, it may be subjected to several processing steps in order to perform any necessary manipulation of the secure data prior to its merging with the non-secure data, and then the actual merging process will be performed, before that data is then placed in the frame store. During this time, the secure data may be vulnerable to unauthorised access which might then allow the secure data in its decoded form to be modified or copied and subsequently distributed. Secondly, the process of merging these two different data sources is both processor intensive, and also memory bandwidth intensive due to the number of accesses required to the memory system storing the data.

GB-A-2,406,403 provides an improved system for handling the generation of display data for a securable display, which provides two separate frame buffers, a first frame buffer being a non-secure buffer arranged to receive non-secure data produced by a non-secure process, and a second frame buffer being a secure buffer operable to receive secure data produced by a secure process. The secure buffer is arranged so that it is not accessible by the non-secure process. A display controller is then provided that is arranged to read the non-secure data from the non-secure buffer and the secure data from the secure buffer, this display controller having merging logic which merges the non-secure data and the secure data in order to produce a combined data stream from which an output to the securable display is derived. Such a system has the benefit that it is easy to implement, and can provide an effective mechanism for protecting the security of the secure data. However, such a solution is relatively costly in that it requires two separate frame buffers, which represents a lot of memory to provide within a typical System-on-Chip (SoC) memory device such as an SRAM device, especially given the current trend for increases in screen size in devices where the technology may be used, for example a set-top box, digital TV, personal media player, in-car entertainment device, mobile telephone, PDA device, laptop computer, etc. Such an approach also increases the complexity of the display controller, which requires merging logic to merge the outputs from both frame buffers.

SUMMARY OF THE INVENTION

A first aspect provides a data processing apparatus, comprising: a display buffer for storing an array of display elements for subsequent output to a display controller, each display element having a security permission indication associated therewith identifying whether that display element is a secure display element or a non-secure display element; at least one processing unit for executing a non-secure process and a secure process, each process issuing access requests when seeking to access display elements in the display buffer, each access request specifying a location in said display buffer; and interface logic associated with the display buffer for receiving each access request, and operable for at least each access request issued by the non-secure process to determine the security permission indication associated with the display element currently stored at the location specified by that access request, and to determine how that access request should be processed dependent on the determined security permission indication.

A display buffer is provided within a data processing apparatus that can store an array of display elements for subsequent output to a display controller, where each stored display element has a security permission indication associated therewith identifying whether that display element is a secure display element or a non-secure display element. The display elements to be stored in the display buffer are produced by a non-secure process and a secure process, and each process may have read and write access to the display buffer. Read access for such processes may be provided for a variety of reasons, for example to facilitate standard operations such as screen capture operations, or to allow graphics programs to perform modifications of the current frame based on some algorithm (in which event the graphics program will read from the frame buffer, perform some modification, and then write back to the frame buffer). When wishing to access the display buffer either to store a new display element in the display buffer, or to read a current display element from the display buffer, each process is arranged to issue an access request specifying a location in the display buffer that is to be accessed.

In accordance with the present invention, interface logic is also provided in association with the display buffer which, for at least any access request issued by the non-secure process, determines the security permission indication associated with the display element currently stored at the location specified by the access request, and takes that determined security permission indication into account when determining how the access request should be processed, in particular to determine whether the access request should proceed as normal with respect to the display buffer, or whether some alternative modified action should be taken.

There are two main security risks with respect to the secure display elements stored in the display buffer, and in any particular implementation one or both of these security risks may be considered important to protect against. The first security risk is loss of secure data confidentiality, and if such confidentiality is required, it must be ensured that any non-secure process in the system cannot read the secure display data. This is a significant security issue in systems where the secure display data contains data that is required to be kept secret, for example digital rights management (DRM) protected video with a non-secure graphics overlay. A second potential security risk is loss of secure data integrity, and if integrity is required, it must be ensured that the secure display data cannot be overwritten by data produced by any non-secure process, since for example such an action could impersonate and interfere with secure software. As a particular example, if such secure data integrity were not protected, a hacker could overwrite the displayed amount of a financial transaction about to be signed for, and then overcharge or siphon the extra amount. However, not all systems will be concerned with secure data integrity. Considering for example a system that is concerned with keeping decoded video secure, as long as a hacker cannot read back the decoded video data, it will not necessarily be considered an issue if that hacker can overwrite the decoded video with bad data, since this will merely result in reduced viewing quality but without the valuable content being copied. Indeed, in many applications, such non-secure overwriting of secure data may be a required feature, for example to allow non-trusted software to place information overlays over a video. An example of such information would be channel or chapter information on a DVD player, and another example would be the drawing of a mouse pointer on secure content where that mouse pointer belonged to non-trusted software.

It can be seen that the interface logic will be able to detect situations where an access request issued by the non-secure process is seeking to access a secure display element as identified by its associated security permission indication, and in such situations can selectively modify the processing of that access request, depending on whether the system is seeking to protect secure data confidentiality, secure data integrity, or both.

Accordingly, the technology described provides a very efficient mechanism for providing protection for secure display elements generated for display on a securable display, without the requirement for multiple frame buffers, thereby significantly reducing the memory requirements when compared with the earlier-described technique.

Further, since a secure process producing secure display elements can directly write the secure data into the display buffer, there is no opportunity for the secure data to be tampered with prior to it being stored in the display buffer. In particular, since both the non-secure process and the secure process can write directly to the display buffer, there is no need to perform any combined merging process before the data is written to the display buffer, and instead both processes directly write their respective data into the display buffer, with the interface logic providing the required protection for the secure display elements stored within the display buffer so as to prevent unauthorised access.

Another benefit is that the display controller can now be a standard display controller device, as contrasted with the display controller in the earlier-described system, where the display controller required additional merging logic for merging data received from two separate frame buffers prior to display. All that is required is to integrate the display controller as a secure peripheral in the system (the display controller need not be aware of the security and can be statically set as a master which generates only secure accesses).

The at least one processing unit that executes the non-secure process and secure process can take a variety of forms. For example, the secure process and the non-secure process may be executed on the same processing unit, or alternatively separate processing units may be provided for executing the non-secure process and the secure process. In addition, more than one non-secure process and more than one secure process may be executed by the at least one processing unit.

In one embodiment, the interface logic has access to control information identifying whether read accesses, write accesses, or read and write accesses to secure display elements from the non-secure process should be prevented, and references the control information when determining how an access request from the non-secure process should be processed if the determined security permission indication identifies the currently stored display element as a secure display element.

Such control information may be predetermined, but in alternative embodiments, that control information can be arranged to be programmable. In particular, in one embodiment, the data processing apparatus further comprises at least one control register accessible by the interface logic and arranged to store said control information, the control register being programmable by a secure setting routine executed by said at least one processing unit.

In accordance with the above described embodiments, the security permission indication identifies a display element as either being secure or non-secure, and the control information is then used to determine what effect that should have with respect to a read or write access attempted to that display element. In an alternative embodiment, the security permission indication can be arranged to provide additional information, and in particular can be arranged to identify a first security indication for read accesses and a second security indication for write accesses. This avoids the need for the additional control information, since whether a display element is to be considered as a secure display element or a non-secure display element can be encoded separately for read and write accesses, thereby directly allowing for secure data confidentiality, secure data integrity, or both. However, such an approach will typically require more memory, due to the increase in size of the security permission indication.

When performing write access requests to the display buffer, a security permission indication needs to be set for the display element being written. In one embodiment, the interface logic is responsible for determining the security permission indication that should be set for such write access requests. In one embodiment, this could merely be done by setting the security permission indication to identify a display element written by a secure process as being a secure display element, and setting the security permission indication to identify a display element written by the non-secure process as being a non-secure display element. However, having regard to a location in the display element that currently stores a secure display element, it is possible at some point in the future that the same location may be required to store a non-secure display element and hence only allowing the security permission indication to be set in dependence on the security of the process writing a display element to the display buffer may be insufficient.

Hence, in one embodiment, for a write access request issued by the secure process specifying a new display element, the interface logic is operable to apply predetermined criteria to determine the security permission indication to be associated with the new display element when stored in the display buffer. Hence, when the secure process issues a write access request, predetermined criteria are applied to determine the security permission indication to be associated with the new display element, thereby allowing the new display element to be marked as either a secure display element or a non-secure display element, dependent of the result of applying that predetermined criteria.

The predetermined criteria can take a variety of forms. However, in one embodiment, an otherwise unused field in the new display element is used by the secure process to specify the required security permission indication and the interface logic is operable to cause the security permission indication to be set in accordance with that otherwise unused field. As a particular example, if the display uses a 555 format (i.e. five bits are used to represent each of the components for each display element (which may for example be represented in RGB or YUV form)), only 15 bits of a 16-bit half word are used to encode the display element data, leaving a bit spare for other purposes. In the above embodiment, this bit can be used to specify the security to be associated with the new display element, thereby allowing the secure process to unlock a previously secure display element by writing to the same location a new display element which is to be treated as non-secure. It will be appreciated that this mechanism is not restricted to 555 format or to RGB or YUV representations of pixels, but instead can be used in any situations where there is at least one spare bit in the data representing each display element.

In an alternative embodiment, the data processing apparatus further comprises at least one control register accessible by the interface logic and arranged to identify the security permission indication to be used for the new display element, the control register being programmable by a secure setting routine executed by said at least one processing unit. Hence, under control of a secure routine, the control register can be programmed to identify the security that is to be associated with all subsequent write accesses issued by the secure process. Hence, for a period of time, the secure process can be arranged to write display elements to the display buffer that are to be treated as non-secure display elements, and then following a re-programming of the control register, the same secure process can be arranged to issue write accesses to store secure display elements in the display buffer.

In an alternative embodiment, the secure process has a plurality of access mechanisms by which access requests can be issued to the display buffer, the interface logic being operable to determine the security permission indication to be associated with the new display element when stored in the display buffer dependent on the access mechanism used by the secure process. Hence, in accordance with such embodiments, the interface logic interprets access requests from the secure process differently, dependent on which access mechanism is used.

The access mechanism can take a variety of forms. However, in one embodiment, the plurality of access mechanisms comprise different ports to which the access request can be issued. Hence, by way of example, a secure port and a non-secure port can be provided. The non-secure process will always issue access requests to the non-secure port and typically the secure process will issue access requests to the secure port. However, the secure process also has the capability to issue an access request to the non-secure port, and such an access request will be interpreted by the interface logic as a request to write a display element to the display buffer that is to be treated as a non-secure display element. If the non-secure process attempts to write to the secure port, the logic will reject that write attempt.

As an alternative to using two physically separate ports, the plurality of access mechanisms may instead comprise different address range aliases that can be used to specify locations in the display buffer. Hence, assuming the display buffer has a particular physical address range, the addressable range that can be used by the secure process to address the display buffer is extended in such an embodiment, and will in effect allow the security to be encoded in the address range. In particular, one alias could be interpreted as indicating a secure display element, whereas the other alias could be interpreted as indicating a non-secure display element.

The security permission indication can be stored in a variety of ways. In one embodiment, the security permission indication is stored separately to each display element. Whilst the security permission indication could in principle be stored outside the display buffer in a manner where access to it was restricted to the interface logic (and possibly one or more other secure master devices if appropriate), in one embodiment the security permission indication is stored within the display buffer.

A single security permission indication may be associated with more than one display element. However, in one embodiment, a separate security permission indication is stored for each display element.

The display elements can take a variety of forms. However, in one embodiment, each display element is a pixel value, for example an RGB value or a YUV value for a particular pixel of the display.

As an alternative to encoding the security permission indication as a separate entity to the associated display element, in one embodiment the security permission indication can be inferred from the display element itself. More particularly, in one embodiment, a range of values are available for the display elements, and a subset of values in said range are reserved for secure display elements when stored in said display buffer, whereby the security permission indication for each display element stored in the display buffer is directly indicated by the display element value. Such an approach may be beneficial in situations where memory space is particularly limited, since it can provide a more efficient encoding than a system where the security permission indication is provided separately. If the secure portion of this securable display is only used for simple user interface purposes, for example requesting a pin from a user, typically there will be very few "secure" colours that are needed, and accordingly only a small number of values in the range need to be reserved for secure display elements. Conversely, when playing a secured video stream, the majority of the colour palette could be made secure, i.e. the subset of values in the range reserved for secure display elements could potentially be large. Typically, a control register accessible by the interface logic would be programmed under control of a secure process to identify the subset of values that are reserved for secure display elements.

Typically, in such an embodiment, it will be desired to prevent a non-secure process from writing a display element that is to be treated as a secure display element. In accordance with one embodiment, this is achieved by providing the interface logic with display element transform logic operable for at least each write access request issued by the non-secure process to selectively perform a transform on the display element in order to produce a transformed display element to be written to the display buffer in response to that write access request, so as to ensure that the write access request results in a non-secure display element being written in the display buffer. In such cases, the transformed display element will be arranged such that it is a value outside of the subset of values reserved for secure display elements.

Clearly, if a display element is transformed in such a manner, and is then subsequently read from the display buffer, the read value will not be the same as the value that was written. In many situations, this may prove not to be a problem. However, in embodiments where this could present a problem, the data processing apparatus can be arranged to further comprise a storage for keeping a record of each transform performed, the interface logic further being operable, for at least a read access request issued by the non-secure process to a location storing a transformed display element, to reference the storage in order to generate an untransformed display element for returning to the process that issued the read access request, so as to mask from the non-secure process the fact that said subset of values in said range are reserved for secure display elements. At least for embodiments where the subset of values reserved for secure display elements is relatively small, it will be appreciated that the storage can be kept reasonably small, since the transformation will only be required fairly infrequently. Such an approach has the benefit that the non-secure process has no visibility of the fact that certain values are reserved for secure display elements. In addition to generating untransformed display elements in response to read access requests issued by the non-secure process, the same mechanism can also be applied, if considered appropriate, in respect of read access requests issued by the secure process, since it will be appreciated that the secure process can also seek to read non-secure display elements.

In one embodiment where such a storage is provided for keeping a record of each transform performed, the interface logic is operable to update said storage following a write access request to a location whose current display element is a transformed display element. Hence, if a transformed display element is subsequently overwritten by a new display element, then the relevant entry in the storage can be removed so as to avoid any incorrect processing of the stored display element when subsequently read from the display buffer. If the new display element is itself transformed, then the relevant entry in the storage can merely be updated rather than removed.

In the above described embodiments where part of the colour space is reserved for secure display elements, it is desirable to seek to reduce the amount of non-secure data that needs to be transformed prior to storage in the display buffer. In one embodiment this is achieved by arranging the subset of values reserved for storing secure display elements in the display buffer to be rarely used colours, thereby reducing the likelihood that a non-secure display element will need to be transformed. However, it may be considered unduly restrictive to enforce secure processes to use only those rarely used colours, and accordingly in one embodiment the interface logic comprises translation logic, responsive to a write access request issued by the secure process specifying a colour outside said subset, to perform a translation operation to translate the specified colour to a colour within said subset. In one particular embodiment the display controller is then provided with an indication of the mapping between actual colours used by the secure process and the rare colours used for storage inside the display buffer, such that on reading secure display elements from the display buffer it can then translate back to the original colours specified by the secure process prior to display of the data.

As mentioned previously, the techniques of the example embodiments can be used to protect secure data confidentiality, secure data integrity, or both. In one particular embodiment, if secure data confidentiality is required but secure data integrity is not, then the interface logic can be arranged to allow write access requests issued by the non-secure process to overwrite secure display elements, but is arranged to prevent read access requests issued by the non-secure process from reading secure display elements. Such an approach can be useful in a variety of situations, for example in systems where secure video is being produced within an area of the securable display. Tampering with the video as displayed will not necessary be considered a problem, but it is important to ensure that the secure content cannot be read by a non-secure process.

In all of the above described embodiments, the display controller will typically be considered to be a secure device, and accordingly it can be arranged to access the display buffer via the interface logic in order to read the display elements stored in the display buffer, whether those display elements be secure display elements or non-secure display elements. Since the display controller is a device designed for a specific, dedicated purpose, namely to generate a display stream for sending to a display device, it is not typically required to provide any mechanism for accessing the data being processed internally within the display controller, and accordingly the display controller can readily be designed as a secure device such that the data processed internally within the display controller cannot be accessed by any non-secure process. Hence, all read access requests issued by the display controller can be treated by the interface logic as secure access requests which are entitled to read any of the display elements within the display buffer.

A second aspect provides a method of managing access to a display buffer in a data processing apparatus, the display buffer storing an array of display elements for subsequent output to a display controller, the method comprising the steps of: associating a security permission indication with each display element stored in the buffer, identifying whether that display element is a secure display element or a non-secure display element; executing a non-secure process and a secure process, each process issuing access requests when seeking to access display elements in the display buffer, each access request specifying a location in said display buffer; and for at least each access request issued by the non-secure process, determining the security permission indication associated with the display element currently stored at the location specified by that access request, and determining how that access request should be processed dependent on the determined security permission indication.

DESCRIPTION OF NON-LIMITING EXAMPLE EMBODIMENTS

Figure 1A:
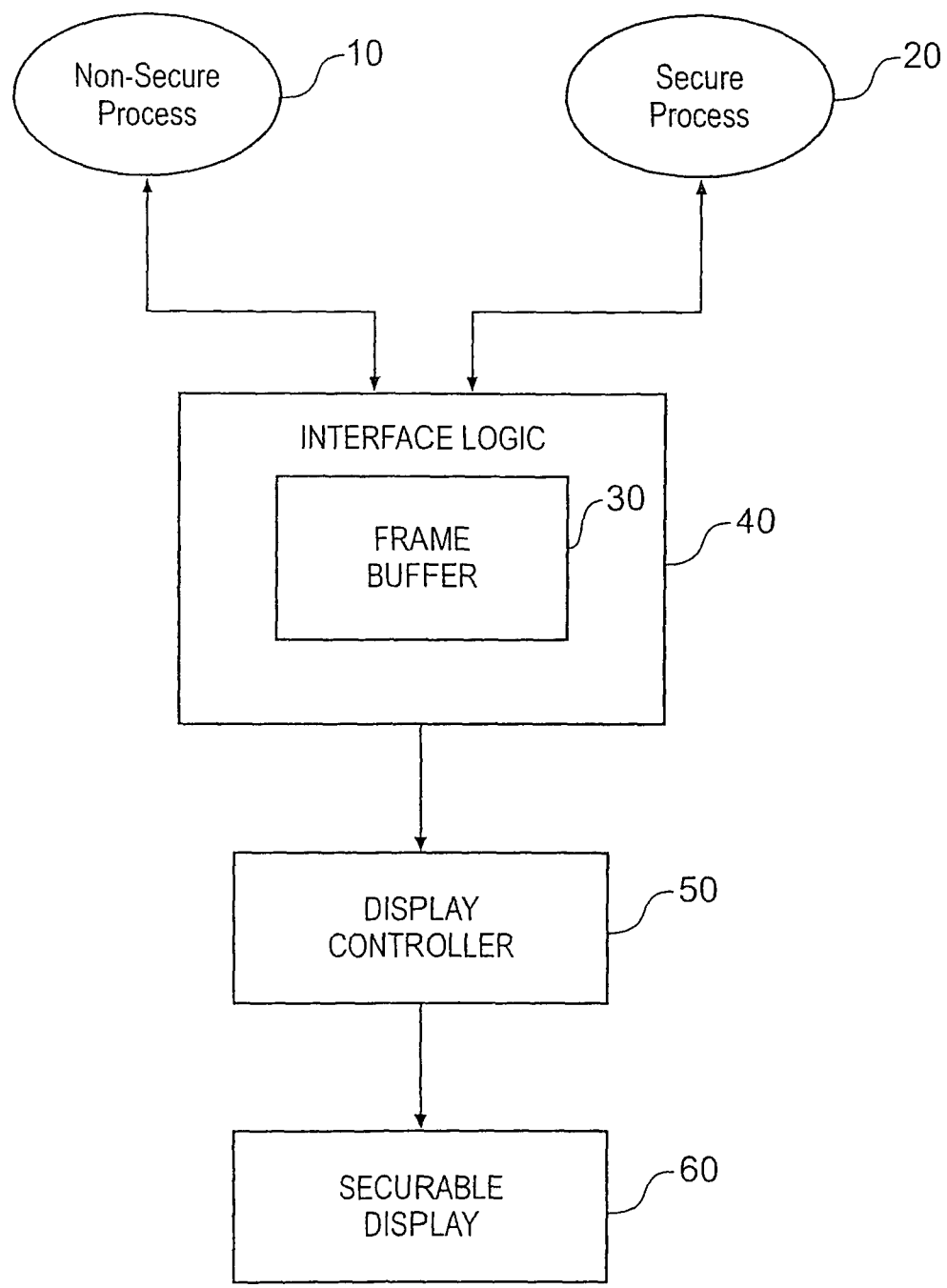
FIG. 1A is a block diagram schematically illustrating the technique used in one example embodiment to produce display data for a securable display.

FIG. 1A is a diagram schematically illustrating the approach taken in example embodiments in order to produce a stream of display elements for storing on a securable display. A non-secure process 10 executing on a processor is used to produce non-secure data which is then output to a frame buffer 30 via interface logic 40. In addition, a secure process 20 executing on a processor (which may be the same processor or a different processor to that executing the non-secure process 10) is used to produce secure data which is also stored in the frame buffer 30 via the interface logic 40. Typically, the non-secure process 10 and secure process 20 will be arranged to issue access requests over a bus infrastructure when seeking to access the frame buffer 30, and the bus infrastructure will employ standard arbitration techniques to arbitrate between simultaneous accesses to the frame buffer 30 in the same manner as it would for general accesses to data in the memory system.

The display controller 50 is then arranged to read the data in the frame buffer 30 in order to produce an output stream for issuing to a connected securable display 60. As will be appreciated by a person skilled in the art, the display controller 50 typically reads data out of the frame buffer 30 line by line so as to issue display information to the securable display 60 on a line by line basis.

The individual display elements stored in the frame buffer 30, in one embodiment each display element representing an individual pixel value, are arranged to have associated therewith a security permission indication identifying whether the associated display element is a secure display element or a non-secure display element. As will be discussed later in more detail, the interface logic 40 is arranged to apply predetermined criteria to decide when a particular display element is written into the frame buffer whether the associated security permission indication should identify that display element as a secure display element or a non-secure display element. As a default position, a display element written into the frame buffer 30 by the secure process 20 will be marked as a secure display element, and a display element written into the frame buffer 30 by the non-secure process 10 will be identified as a non-secure display element. However, techniques are provided in embodiments to allow locations in the frame buffer storing secure display elements to subsequently be allowed to store non-secure display elements, and in particular in some embodiments the secure process 20 can produce display elements which the interface logic 40 can interpret as either being secure display elements or non-secure display elements, dependent on certain control information.

Further, the interface logic is arranged such that for at least each access request issued by the non-secure process 10, a determination is made as to how that access request should be processed taking into account the security permission indication associated with the current display element stored in the location of the frame buffer 30 referenced by the non-secure access request.

In addition to being able to write to the frame buffer 30, typically the non-secure process 10 and the secure process 20 may be allowed in certain situations to issue read access requests to the frame buffer 30, such functionality being provided for example to support screen capture processes and the like. The ability of the non-secure process 10 to potentially write to any location in the frame buffer 30 and to read from any location in the frame buffer 30, gives rise to two main security risks, namely loss of confidentiality of secure display data stored in the frame buffer, and loss of integrity of secure display data stored in the frame buffer 30. If confidentiality of the secure display data 30 is required, it must be ensured that the non-secure process 10 cannot read any display element in the frame buffer indicated as being a secure display element. Similarly, if integrity of the secure display data is required, it must be ensured that the non-secure process 10 cannot overwrite any secure display element stored in the frame buffer 30. As will be discussed in more detail later, the interface logic 40 is arranged to police the accesses made by the non-secure process 10 to ensure that either secure data confidentiality, secure data integrity, or both, is maintained with respect to the secure display elements stored in the frame buffer 30.

Figure 1B:
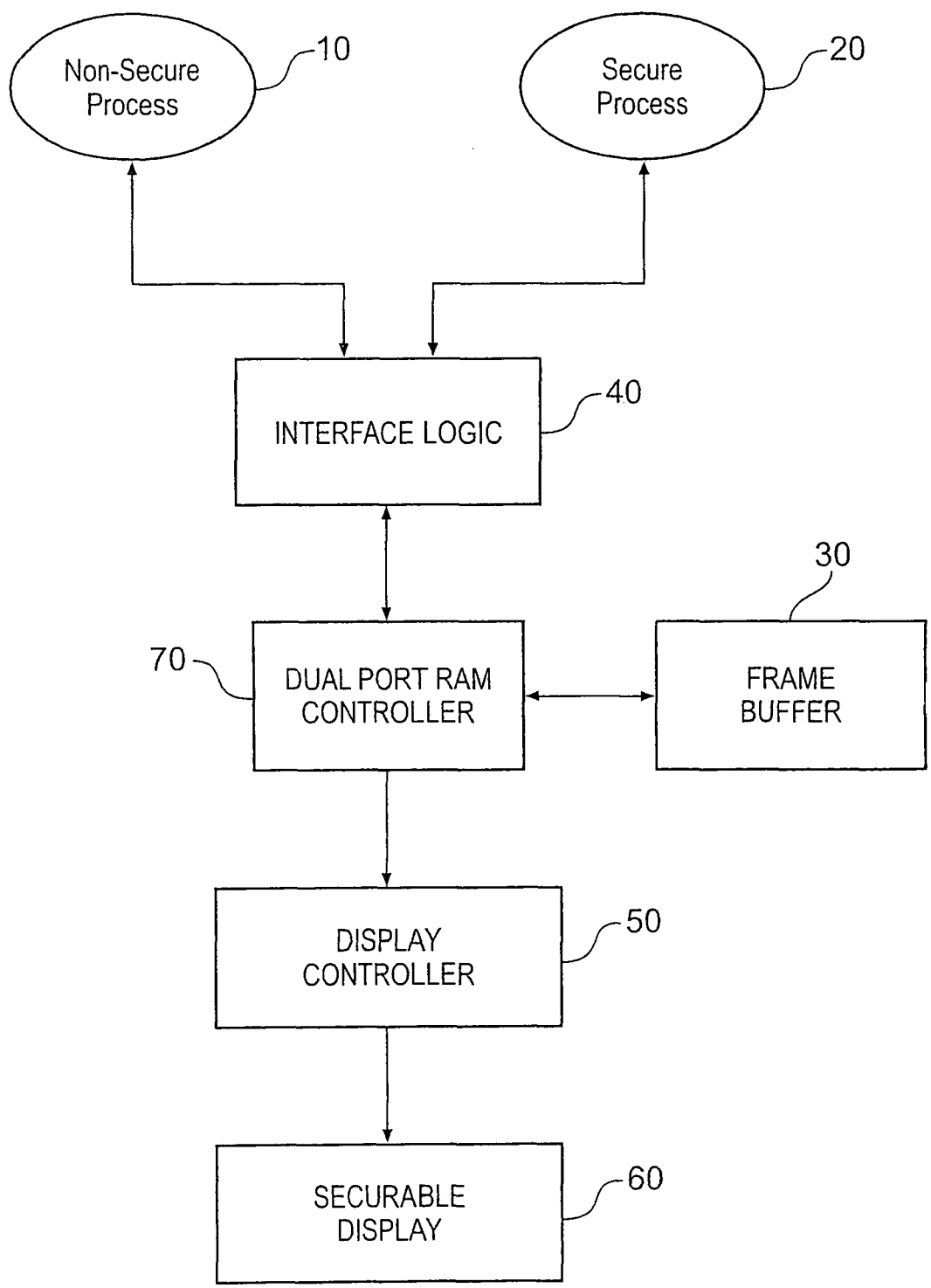
FIG. 1B is a block diagram schematically illustrating the technique used in another example embodiment to produce display data for a securable display.

The display controller 50 is typically arranged so that it only makes read accesses to the frame buffer 30, and accordingly accesses made by the display controller do not give rise to any data integrity issues. Further, the display controller will typically be configured as a secure device such that its read accesses are treated as secure accesses. Hence, the confidentiality issue also does not arise for such read accesses. Hence, as an alternative to the approach shown in FIG. 1A, the approach shown in FIG. 1B can be used, where a dual port RAM controller 70 manages accesses to the frame buffer 30 made by the interface logic 40 or by the display controller directly. The interface logic 40 continues to police the accesses of the non-secure process 10 and secure process 20, but accesses from the display controller bypass the interface logic 40.

Figure 2A:
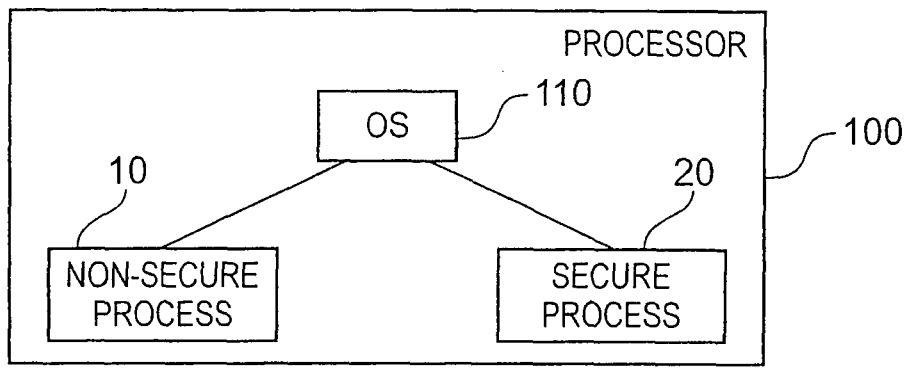
FIGS. 2A to 2C schematically illustrate how the non-secure process and secure process are arranged in different example embodiments.
Figure 2B:
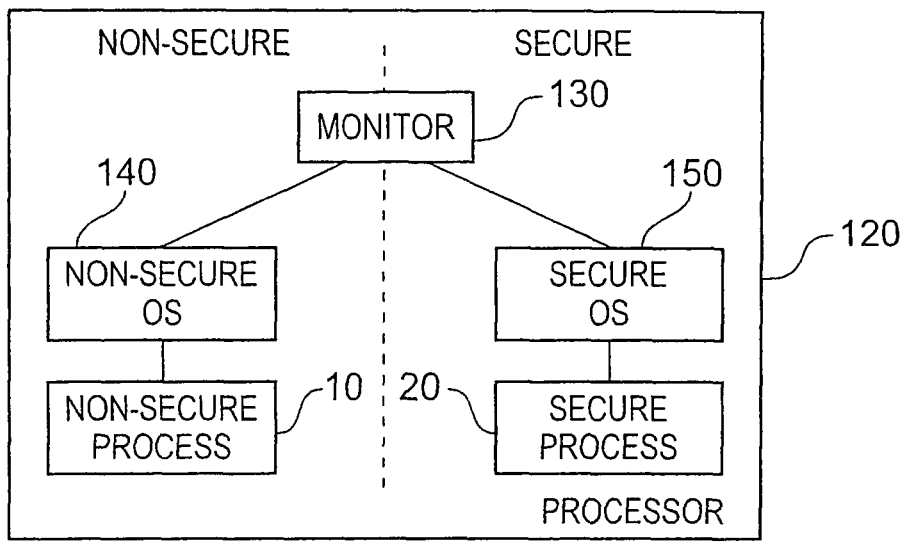
Figure 2C:
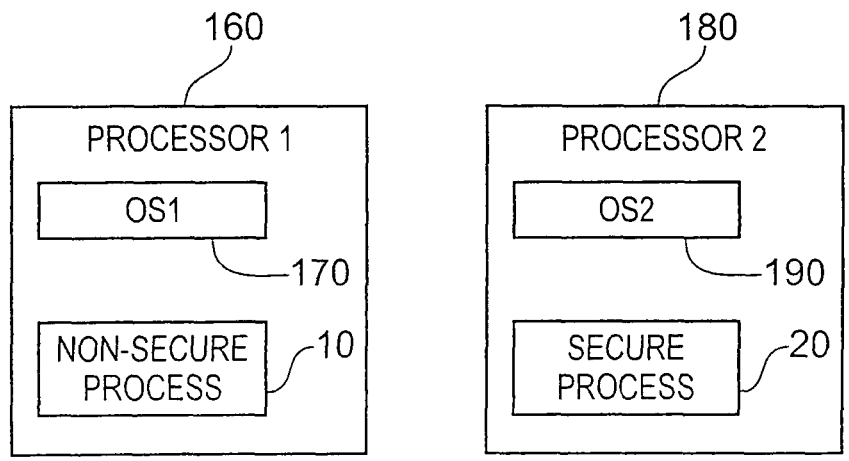

FIGS. 2A to 2C illustrate different ways in which the non-secure process 10 and the secure process 20 can be executed in accordance with different embodiments. In accordance with FIG. 2A, both the non-secure process 10 and the secure process 20 are run by the same operating system 110 running on a processor 100. In such embodiments, the operating system 110 is considered to have sufficient security to ensure that the non-secure process 10 cannot issue an access request in a manner that makes it look like that access request is being issued by a secure process.

FIG. 2B schematically illustrates an alternative embodiment, in which various programs running on a processor 120 are run in either a secure domain or a non-secure domain. The system is provided with a monitor program 130 which executes at least partially in a monitor mode. The monitor program 130 is responsible for managing all changes between the secure domain and the non-secure domain in either direction. From a view external to the processor 120, the monitor mode is always secure and the monitor program is in secure memory.

Within the non-secure domain there is provided a non-secure operating system 140 and the non-secure process 10 is arranged to run on that non-secure operating system. In the secure domain, a secure operating system 150 is provided, and the secure process 20 is arranged to run on that secure operating system. In one embodiment, the secure operating system 150 is designed to provide only those functions which are essential to processing activities which must be provided in the secure domain, such that the secure operating system can be as small and simple as possible, since this encourages thorough design for security, through testing, and gives less volume of code which could have bugs.

In accordance with such an arrangement, the system does not rely on the operating system alone to provide the required level of security, and instead security is enforced at the hardware level. In particular, a signal is issued in association with each access request identifying whether that access request has been issued by a process executed in the secure domain, or a process executing in the non-secure domain. This signal is asserted at the hardware level and cannot be tampered with by the non-secure process. Indeed, in some embodiments, the presence of the secure domain is entirely hidden from applications executing in the non-secure domain.

The arrangement illustrated in FIG. 2B is that employed within ARM processors employing a TrustZone architecture, as developed by ARM Limited, Cambridge, United Kingdom. More details of such a system are described for example in GB-A-2,396,034 and GB-A-2,396,713.

In an alternative embodiment illustrated in FIG. 2C, separate processors 160 and 180 are used to run the non-secure process 10 and the secure process 20, respectively. In particular, a first operating system 170 is provided on the first processor 160, and the non-secure process 10 runs on that operating system. In addition, a second operating system 190 is provided on the second processor 180, and the secure process 20 runs on that operating system.

Whilst in the above described embodiments, only a single non-secure process and a single secure process are shown, it will be appreciated that multiple non-secure processes and multiple secure processes may be running, and all or at least a subset of those processes may have access to the frame buffer 30.

As discussed earlier with reference to FIGS. 1A and 1B, irrespective of which approach is used, it is important to ensure that secure display elements produced by the secure process 20 and stored in the frame buffer 30 cannot be tampered with by any non-secure process having access to the frame buffer 30, taking into account the required security for such secure display elements, namely whether confidentiality, integrity, or both are required to be maintained. Indeed, in some instances it may be appropriate to ensure that certain secure display elements stored in the frame buffer 30 cannot be tampered with by some of the secure processes running within the system, and this particular option will be discussed in more detail later.

Figure 3:
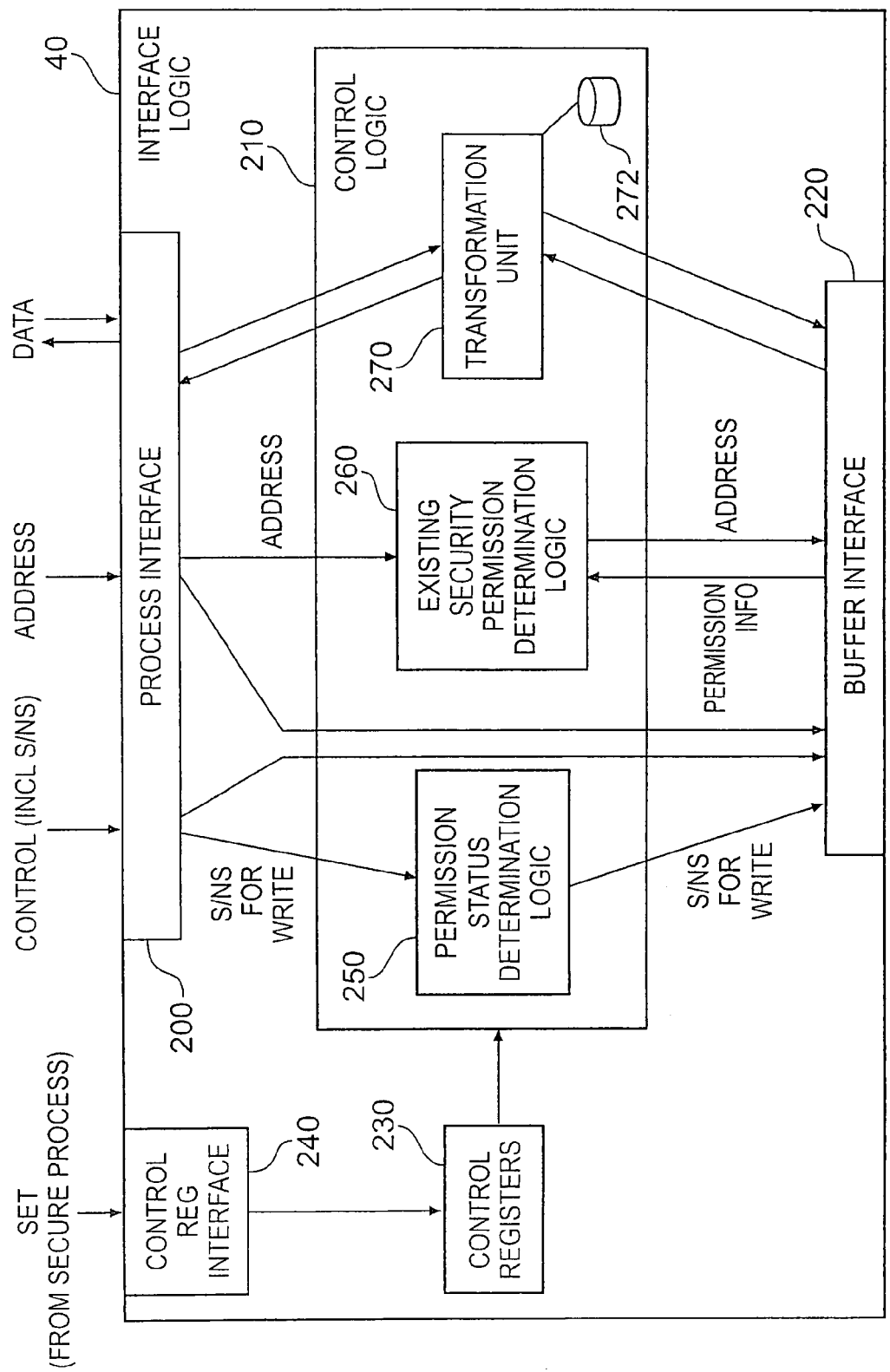
FIG. 3 is a block diagram illustrating the interface logic of FIG. 1A or 1B in accordance with one example embodiment.

FIG. 3 is a block diagram illustrating in more detail components provided in the interface logic 40 in order to achieve the above-mentioned aims. The interface logic 40 has a process interface 200 via which the secure process 20 and the non-secure process 10 can seek access to the frame buffer 30. Assuming the FIG. 1A approach is taken, this same interface can also be used by the display controller 50, which will be arranged as a secure device, and accordingly will issue read access requests which are interpreted as secure read access requests by the interface logic 40. The interface logic 40 also includes a buffer interface 220 for interfacing to the frame buffer 30. In one embodiment of the FIG. 1A approach, a separate interface can be provided within the interface logic 40 for use by the display controller 50, which routes requests from the display controller directly to the buffer interface 220 bypassing the control logic 210.

The interface logic 40 also includes certain control registers 230 which can be programmed via a control register interface 240 from a secure process running within the system. In one embodiment, the control register interface 240 and process interface 200 can be provided by the same physical interface but arranged to use different addresses. The secure process used to set the control registers may be the same process as the secure process 20 producing display elements for storing in the frame buffer 30, or alternatively may be a separate secure process executing within the system. The control registers 230 can be arranged to store a variety of control information, for example control information providing global confidentiality and/or integrity information defining the security to be applied with respect to secure display elements within the frame buffer. Additionally, the control registers may optionally be used to store control information identifying the security permission indication that should be associated with any new display elements produced by the secure process for writing into the frame buffer, this hence allowing the secure process to produce display elements that are either marked as secure display elements or non-secure display elements, depending on such control information. Further, as will be described in more detail later with reference to FIG. 6, in some embodiments the range of values available for the display elements may be subdivided, such that a subset of values in the range are reserved for secure display elements, this allowing the security permission indication associated with each display element to be directly inferred from the display element's value itself. Information about the subset of values that are reserved for secure display elements can also be stored with the control registers 230 in such embodiments.

As another example of information that can also be stored within the control registers 230, when a read access by the non-secure process 10 is attempted in respect of a secure display element, and the interface logic 40 decides that that access should not be allowed to proceed (because secure data confidentiality is required), then one option for handling that read access request is for the interface logic to cause a dummy colour value to be returned. This dummy colour value can be programmed into the control registers 230, so as to allow some configurability as to what that dummy colour value should be.

Each access request issued by the processes 10, 20 or the display controller 50 will include some control information, an address identifying the location within the frame buffer the subject of the access request, and for write accesses will also specify the display element to be written. The control information will typically include some information identifying the security associated with the process producing the access request. For the TrustZone example discussed earlier with reference to FIG. 2B, there will actually be a separate bit of information specifying whether the access request has been issued from the secure domain or the non-secure domain, all accesses from the display controller 50 being considered to have emanated from the secure domain. In other embodiments such as those illustrated in FIGS. 2A and 2C, this security information will be inferred from the access information. For example, with reference to the FIG. 2A example, some control information will be included under the control of the operating system 110 to identify the source of the access request. Similarly, for the FIG. 2C example, the initiating processor can be identified from the access request information.

Each access request received is processed by the control logic 210 within the interface logic 40. For certain read and write accesses, these will be allowed to proceed unchecked, and accordingly the control and address information can be passed directly to the buffer interface 220. Write and read data associated with access requests is arranged in one embodiment to pass through a transformation unit 270 which can optionally perform some transformation on write data routed from the process interface 200 to the buffer interface 220, and further optionally perform some reverse transformation process when that previously transformed data is subsequently read from the frame buffer. However, for many access requests, it will not be necessary to perform such transformation, and the data will merely pass unmodified through the transformation unit 270. Indeed, in some embodiments, the transformation unit 270 need not be provided.

As will be discussed in more detail later, for certain types of access, it will be necessary for the interface logic 40 to ascertain the existing security permission indication for the display element currently stored at the location indicated by the access request. This process is undertaken by the existing security permission determination logic 260 of the control logic 210, which in such instances receives the address, and propagates that address via the buffer interface 220 to the frame buffer 30 in order to retrieve the security permission information pertaining to that address. This process is typically initiated in respect of non-secure accesses, so as to allow the control logic 210 to take into account whether the non-secure process is attempting to access a location in which a secure display element is stored, and to then selectively alter the way in which the access request is handled if required having regards to the secure data confidentially and/or integrity requirements of the system. In one embodiment, the security permission determination logic 260 can be arranged to perform the above security permission information retrieval process speculatively in anticipation of a sequence of accesses being made.

As discussed earlier, in one embodiment, such secure confidentiality and integrity requirements are stored within the control registers 230, and accordingly the control logic 210 references that information once the existing security permission determination logic 260 has retrieved the required security permission information, so as to decide how to proceed with respect to such access requests (for read accesses the data can be read from the frame buffer whilst the security permission check is being performed, provided the data is not returned to the requesting process until the security check is passed). Depending on the requirements of the system, such accesses may be allowed to proceed, or alternatively some permissions fail process may be required. The permissions fail process may involve issuing an abort signal rather than continuing to process the access request, or alternatively some different action can be taken. For example, for read accesses which the control logic 210 determines should fail, it may be more appropriate to return a dummy colour value to the non-secure process issuing the access request, so that the non-secure process then receives a response to the access request it issues, but without prejudicing the security of secure display elements. For a write access request which the control logic 210 determines should not proceed, it may simply be appropriate to allow the write request to fail silently, i.e. for the write not to be performed with respect to the frame buffer, but without the need to issue any response to the non-secure process issuing the access request.

As also shown in FIG. 3, the control logic 210 includes permission status determination logic 250, which for certain write access requests makes a determination as to the appropriate security permission indication to set in association with the new display element being stored in the frame buffer. In particular, for secure write access requests, the permission status determination logic 250 will apply predetermined criteria to decide whether the new display element written to the frame buffer should be identified as a secure display element or a non-secure display element. As will be discussed later with reference to FIGS. 5A to 5C, there are a number of different techniques that can be applied by the permission status determination logic 250 to make this determination, and this functionality is valuable, as it enables locations that have been used to store secure display elements to subsequently be used to store non-secure display elements if the secure part of the system subsequently decides that the associated location no longer is needed for the secure display.

Considering the transformation unit 270, this is typically used in embodiments where the available colour space is subdivided, such that certain colours are reserved for secure display elements. Through use of the transformation unit, it is possible to enable the non-secure process to continue to use the full colour space, but with any values that the non-secure process writes being transformed if necessary to values that are implied as being non-secure values prior to those values being written in the frame buffer. If it is considered to be appropriate to undo that transformation if such a transformed display element is subsequently read from the frame buffer, then in one embodiment a local storage 272 is provided for keeping a record of any transformations performed and the locations in which the transformed data is stored. This then allows the transformation unit 270 to undo any transformation applied when a transformed display element is read from the frame buffer, within the limits of the local storage (as will be discussed in more detail later).

In such embodiments, whenever a new display element is written to the frame buffer, a check is made as to whether that new display element is overwriting a transformed display element, and if so the storage 272 is updated so as to remove the record for the location in question.

Figure 4:
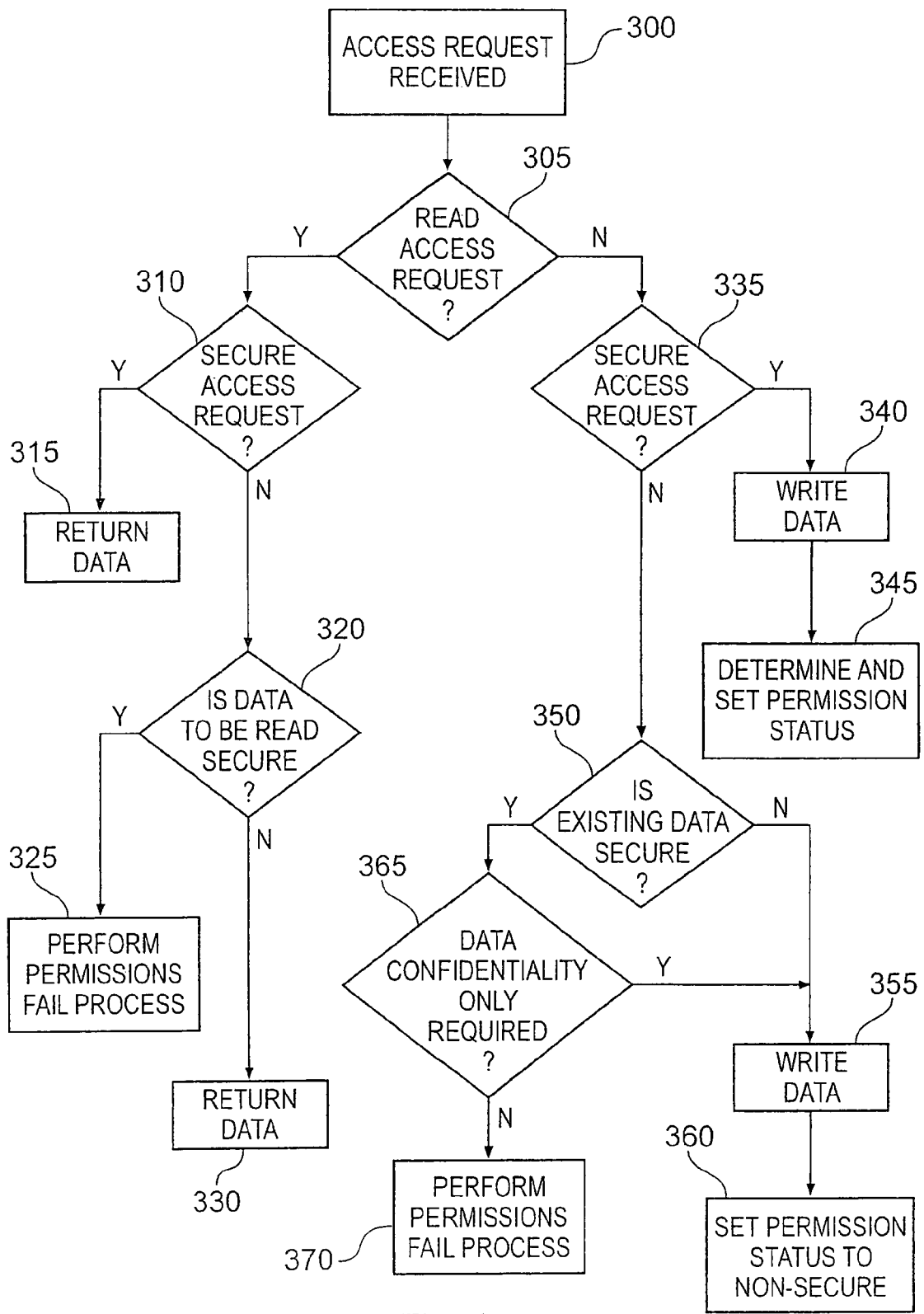
FIG. 4 is a flow diagram illustrating the operation of the interface logic of FIG. 1A or 1B in accordance with one example embodiment.

FIG. 4 is a flow diagram illustrating the operation of the interface logic 40 in accordance with one embodiment. At step 300, an access request is received, whereafter at step 305, it is determined whether the access request is a read access request. If so, the process branches to step 310, where it is determined whether the read access request is a secure access request. If so, the access request is allowed to proceed without any checks being necessary, and accordingly this results in the data being returned at step 315 from the frame buffer 30.

However, if it is determined at step 310 that the read access request is not a secure access request, then the process proceeds to step 320, where the existing security permission determination logic 260 is used to determine whether the data to be read is identified as a secure display element. If not, the access can proceed, resulting in the data being returned at step 330. However, if it is determined that the data to be read is secure, then the process proceeds to step 325, where a permissions fail process is performed.

In the embodiment illustrated in FIG. 4, it is assumed that secure data confidentiality is always required but that secure data integrity may be optional. Since secure data confidentiality is always required, then following step 320 a permissions fail process is initiated since any attempt to read a secure display element from the non-secure process 10 must be prevented. It will be appreciated that if secure data confidentiality was optional, then instead of proceeding directly to step 325, an intermediate test could be performed to determine whether data confidentiality was required, and if not, the read access would be allowed to proceed.

Returning to step 305, if it is determined that the access request is a write access request, then at step 335 it is determined whether the access request is a secure access request. If so, the access request is allowed to proceed, and accordingly the data is written to the frame buffer at step 340, and at step 345 the permission status determination logic 250 is used to determine and set the permission status to be associated with the display element that has been written at step 340. The various techniques that can be employed to implement step 345 will be discussed later with reference to FIG. 5A to 5C.

If at step 335 it is determined that the write access request is not a secure access request, then at step 350 the existing security permission determination logic 260 is used to determine whether the existing data already present at the identified location in the frame buffer is secure or not. If it is not, then the write access can proceed, resulting in the data being written at step 355. At step 360, the permission status is set to non-secure, since in this embodiment the non-secure process is not allowed to write display elements into the buffer which are to be treated as secure display elements.

If at step 350 it is determined that the existing data is secure, then at step 365 it is determined whether only data confidentiality is required, i.e. data integrity is not required. If so, then the write access can be allowed to proceed, and steps 355 and 360 are performed, resulting in the new display element overwriting the previous secure display element, but with the new display element being marked as non-secure. However, if at step 365 it is determined that data integrity is required, then the process proceeds to step 370 where a permissions fail process is performed.

In one embodiment, the permissions fail process performed at step 325 will result in a dummy value being returned to the non-secure process issuing the read access request. Similarly, if the permissions fail process is performed at step 370, in one embodiment this will merely result in the non-secure write access request failing silently. Alternatively, either of steps 325 or 370 could result in a signal such as an abort signal or an interrupt signal being issued back to the non-secure process to identify that the access request has not been allowed to proceed.

In the general case, it will be seen that the actions performed by the interface logic 40 in accordance with the process of FIG. 4 are as shown in the following truth table, assuming secure data confidentiality and integrity are required:

TABLE 1

| Access Type | Existing Pixel Security Setting | Action |
| --- | --- | --- |
| Secure Read | Non-Secure | Return Data |
| Secure Write | Non-Secure | Write Data, Pixel Security = Secure |
| Secure Read | Secure | Return Data |
| Secure Write | Secure | Write Data, Pixel Security = Secure (unchanged) |
| Non-Secure Read | Non-Secure | Return Data |
| Non-Secure Write | Non-Secure | Write Data, Pixel Security = Non-Secure (unchanged) |
| Non-Secure Read | Secure | Abort/Return Dummy Value |
| Non-Secure Write | Secure | Abort/Fail Silently |

Figure 5A:
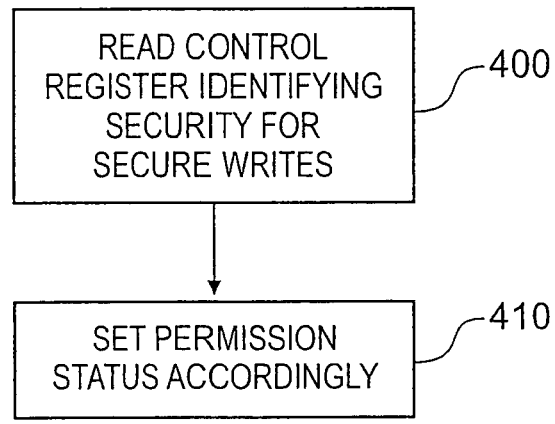
FIGS. 5A to 5C are flow diagrams illustrating alternative example embodiments for implementing step 345 of FIG. 4.
Figure 5B:
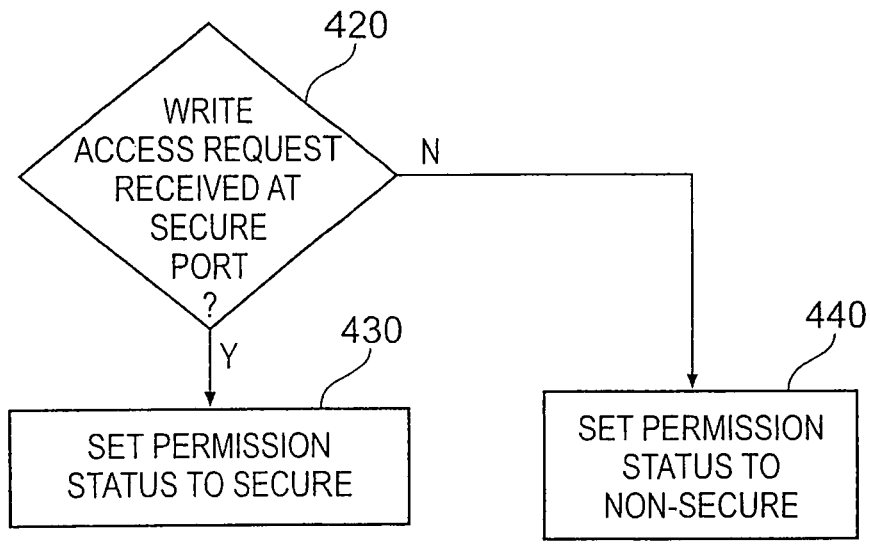

As this truth table shows, a problem could arise in that once a location has been used to store a secure display element, it is not straight forward to allow that same location to subsequently be used to store a non-secure display element since a non-secure write access to a location currently storing a secure display element will result in the write failing silently, or an abort being issued. However, there are a number of ways in which such functionality can be facilitated. FIG. 5A illustrates a process that can be used to implement step 345 of FIG. 4 so as to allow such functionality. In particular, in accordance with this embodiment, one of the control registers 230 is programmed to identify the security that should be associated with all subsequent secure write accesses. Accordingly, at step 400, the permission status determination logic 250 can read the control register 230 in order to identify the security for a secure write access request that has been received. Thereafter, the permission status can be set accordingly at step 410 when the display element the subject of that write access request is stored in the frame buffer 30.

An alternative approach is shown in FIG. 5B, again the steps illustrated therein being used to perform step 345 in FIG. 4. In accordance with this embodiment, the interface logic 40 and associated frame buffer 30 is provided with dual ports, one being a secure port and the other being a non-secure port. Typically, any access request issued by the non-secure process 10 will be routed to the non-secure port, and any access request issued by the secure process 20 will be issued to the secure port. However, the secure process 20 also has the option to issue a secure access request to the non-secure port. In accordance with such embodiments, at step 420 the interface logic 40 determines whether the access request has been received at the secure port. If so, the process proceeds to step 430, where the permission status is set to identify the new display element stored in the frame buffer as being a secure display element. However, if at step 420 it is determined that the write access request has been received at the non-secure port, then the process proceeds to step 440, where the permission status is set to identify the new display element written into the frame buffer as being a non-secure display element.

In some embodiments, the provision of two physically separate ports may be considered too expensive, and an alternative approach for implementing a similar system would be to use alias/shadow address ranges for the frame buffer 30 so as to allow more security data to be encoded. In accordance with such an approach, the frame buffer 30 will be of a fixed size, but the addressable range of addresses which map to the frame buffer will represent a range of addresses larger than the frame buffer's size, thereby allowing aliasing to take place. In a simple example, the available address range may be twice that of the physical address size of the buffer, such that two different addresses can be specified to identify any particular location in the frame buffer. In accordance with such techniques, if one address is used, this will be interpreted by the interface logic 40 as indicating that the data element being written is to be marked as a secure display element, whereas if the other address is used this will cause the interface logic to determine that the display element being written should be marked as a non-secure display element.

Another option which could be used would be to access the frame buffer 30 in a similar way to a NOR flash device, such that a sequence of secure control codes need to be written to the frame buffer in order to unlock certain locations, by changing the security permission indication associated with those locations from secure to non-secure. However, a potential issue with such an approach is that it would adversely impact performance, since multiple write operations would be required in order to achieve such functionality.

A further alternative approach which could be used would be to add an additional interface to the interface logic to allow security permission indications to be changed for particular locations, this being done under the control of a secure process executing on the system. Such an interface could also be used to configure a dummy value to be returned in the event of a non-secure read access to a secure display element.

Figure 5C:
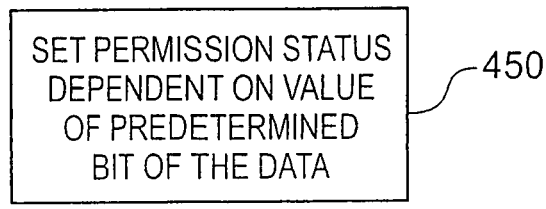

FIG. 5C illustrates a further alternative embodiment which can provide a very efficient mechanism for determining and setting the permission status at step 345 of FIG. 4 for some embodiments. In many display systems, a 555 format is used to encode pixel data, such that five bits are used for each of the red, green and blue components of the pixel. However, typically a 16-bit value is used to encode the pixel data, and hence the 555 format leaves a bit spare for other purposes. This additional bit can be used to simplify the security unlock stage described above by allowing secure write accesses to specify whether the display element should be treated as secure or non-secure dependent on how the spare bit is set. Hence, as shown in FIG. 5C, step 450 can be used to implement step 345 in FIG. 4, where the permission status is set dependent on the value of a predetermined bit of the data specified in the write access request. This hence results in a modification of the earlier discussed Table 1, such that it is now as given in Table 2 below:

TABLE 2

| Access Type | Existing Pixel Security Setting | Action |
| --- | --- | --- |
| Secure Read | Non-Secure | Return Data |
| Secure Write | Non-Secure | Write Data, Pixel Security = Bit [15] of data write. |
| Secure Read | Secure | Return Data |
| Secure Write | Secure | Write Data, Pixel Security = Bit [15] of data write. |
| Non-Secure Read | Non-Secure | Return Data |
| Non-Secure Write | Non-Secure | Write Data, Pixel Security stays Non-Secure |
| Non-Secure Read | Secure | Abort/Return Dummy Value |
| Non-Secure Write | Secure | Abort/Fail Silently |

Whilst such an approach is a very efficient technique for enabling locations storing secure display elements to be unlocked, it is clearly only available for colour encodings where there is a bit spare in the pixel data.

Alternatively, it would be possible to make use of this optimisation in the general case by making the memory port larger than the pixel size. For example, if a 32-bit memory port was used for a 16 (565 format) or 24 (888 format) bit pixel, then the interface logic 40 could interpret one or more of the otherwise unused bits of the word in a similar way to the way bit 15 is interpreted in the Table 2 above. This could still represent an efficient approach, as the internal RAM forming the frame buffer and interface logic 40 could be a non-standard RAM with 17 or 25 bits per pixel internal storage, respectively, considering the above two examples. A potential downside to such an approach may be that block transfer of pixel data would become less efficient, and such a specialist frame buffer memory may be hard to reuse for other purposes.

In the above described embodiments, the security permission indication is provided separately to each display element. In one particular embodiment, each display element is a pixel value, and the security permission indication comprises at least one additional bit in association with each pixel.

Figure 6:
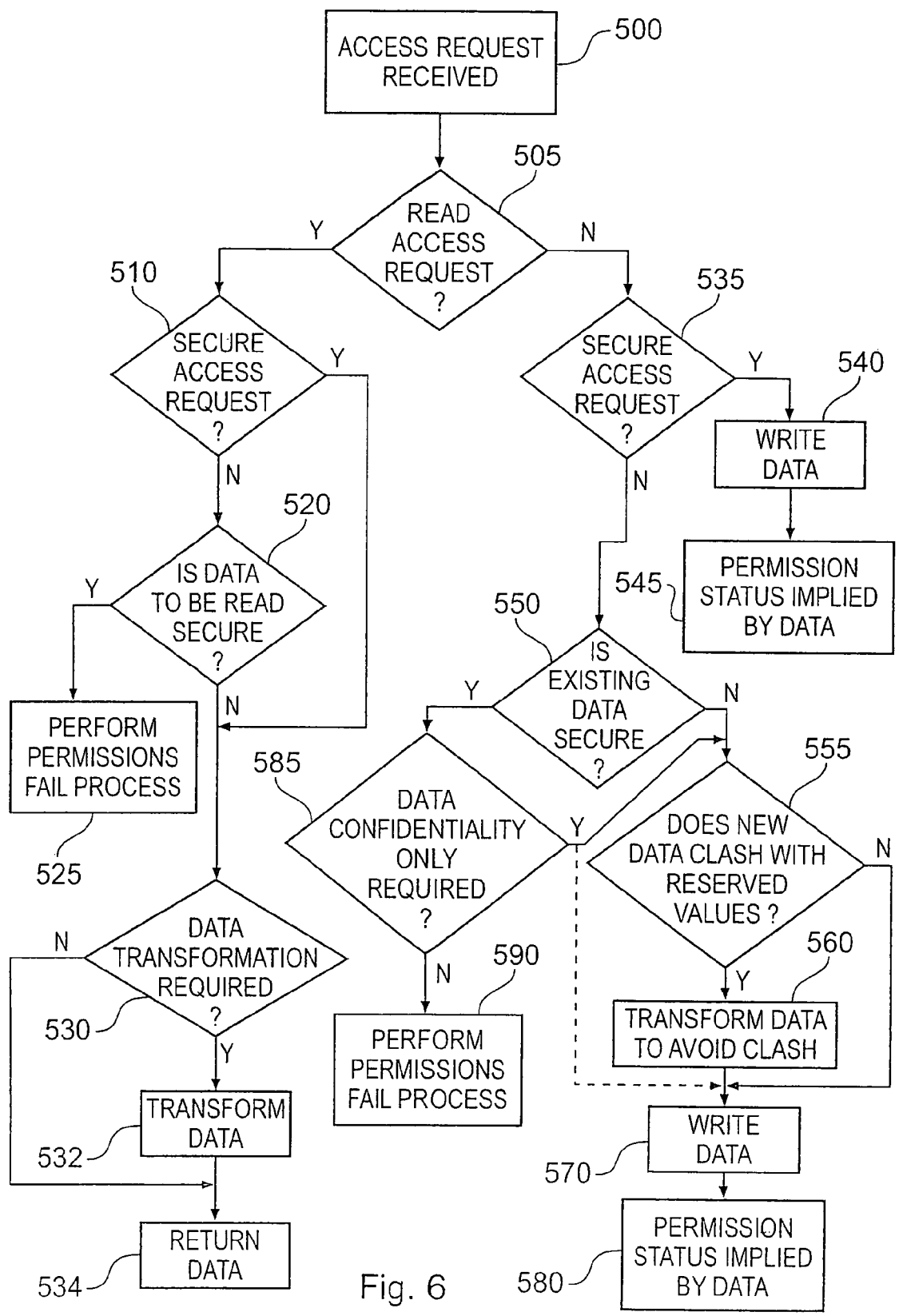
FIG. 6 is a flow diagram illustrating the operation of the interface logic in accordance with an alternative example embodiment.

FIG. 6 is a flow diagram illustrating an alternative technique that can be employed within the interface logic 40 in situations where using an entire bit to encode the security state of each pixel is considered unduly expensive. In accordance with the approach described with reference to FIG. 6, the colour palette is split asymmetrically. If the secure display is only used for simple user interface purposes, for example requesting a pin from a user, few "secure" colours are needed. Conversely, when playing a secured video stream, the majority of the palette could be made secure. Control information would be stored in the control registers 230 under the control of a secure process to identify which colours are to be reserved as secure colours. It is then possible to store the display elements in the frame buffer such that the values of those display elements themselves identify the security permission associated with those display elements. As with the discussion of FIG. 4, it is assumed in FIG. 6 that secure data confidentiality is always required, and the requirement for secure data integrity may be optional. Steps 500, 505, 510, 520, 525, 535, 540 are analogous to steps 300, 305, 310, 320, 325, 335 and 340, respectively, described earlier with reference to FIG. 4, and accordingly will not be discussed further herein. However, it should be noted that if at step 510 it is determined that a secure read access is taking place, this does not immediately result in the access request proceeding and the data being returned as in the FIG. 4 example, and instead the process proceeds to step 530 where it is decided whether any data transformation is required.

As with the earlier discussion of FIG. 4, in FIG. 6 a secure write access request is allowed to proceed, resulting in data being written to the frame buffer at step 540. However, in accordance with this embodiment, at step 545 the permission status information is implied by the data value itself, and accordingly no determination step equivalent to step 345 in FIG. 4 is required.

For a non-secure write access request, it is determined at step 550 by the existing security permission determination, logic 260 whether the existing data at the specified location is secure. If not, a check is then made at step 555 to determine whether the new data to be written clashes with the reserved values for secure display elements. Since the non-secure application may be using the full colour palette, it is possible that it will specify a value which internally within the frame buffer is to be viewed as a secure value. In that case, the process proceeds to step 560, where the transformation unit 270 performs a transformation on the data in order to avoid the clash, i.e. to produce a display element which is not one of the reserved values, whereafter the transformed data is written to the frame buffer 30 at step 570. Again, at step 580, the permission status is then implied by the data and in this instance will identify that the data is non-secure.

If at step 550, it is determined that the existing data is secure, then at step 585 it will be determined whether data confidentiality only is required, or whether in addition data integrity is required. If data integrity is required, then the write access will not be allowed to proceed, and instead a permissions fail process will be performed at step 590. However, if data confidentiality only is required, then in principle the write access request can continue. In one embodiment, in such a scenario, the process branches to step 555, such that any value written is identified as a non-secure display element. However, in an alternative embodiment, the process can proceed as shown by the dotted line in FIG. 6 directly to step 570, so that the data is written without any transformation being performed. In this instance, it is possible that the permission status implied by the data at step 580 will identify the data as secure data. However, since in this instance data integrity was not required, the overwriting of the previous secure display element is not problematic, and further this new display element that has been written will not be readable by any non-secure process, given the requirement for data confidentiality, and accordingly the marking of this data as a secure display element has no adverse effect.

Returning to the discussion of the read process, step 530 will be encountered if either a secure read access is occurring, or a non-secure read access to a non-secure location is taking place. Since as discussed earlier data written into the frame store may have been transformed at step 560, in the embodiment shown in FIG. 6 it is determined whether a data transformation is required on reading the data out from the frame buffer in order to reverse the effects of the transformation performed at step 560. In particular, as described earlier with reference to FIG. 3, a storage 272 can be provided to keep a record of display elements that have been transformed and the manner in which they have been transformed, so that if it is determined at step 530 with reference to that storage that the display element in question is a transformed display element, then a transformation process can be performed at step 532 in order to transform the data to undo the transformation previously applied at step 560 when the display element was written to the frame buffer. Thereafter, the process can proceed to step 534 where the data is returned, or can proceed directly to step 534 in the event that it is determined at step 530 that no data transformation is required.

To guarantee the reconstruction of transformed data on a read for every display element would require storage of 1 bit per display element to record the transformation status. This hence effectively requires the same storage requirements as the other embodiments described earlier, except that the security specification is implicit in the protocol, not explicit.

The local transform store 272 can only be smaller than this if the guarantee of always correctly reversing the transform is removed. This is not always a problem, and in most cases would be an acceptable compromise.

Typically rarely used colour encodings would be reserved as secure, to minimize the chance that the transform is actually needed for a given pixel. However, rarely used colours are not likely to be in the visually appealing colour range (which is why they are rare). To provide secure processes with a sensible set of colours, the interface logic 40 could be provided with a palette of colours (configurable by secure accesses only) which enables a translation of the actual colour used by the secure software into the "rare" colour encoding that is actually used to store the data in the frame buffer. This functionality could in one embodiment be implemented within the transformation unit 270 of FIG. 3. The display controller would in such embodiments also be provided with the palette of colours to enable it to translate from the rare colour back to the originally specified colour prior to display.

In an alternative embodiment, it may be acceptable for transformed data to be returned directly without seeking to undo the transformation applied, and in such embodiments steps 530 and 532 can be omitted.

In embodiments where the transformation process is used, then when writing a display element to the frame buffer 30 at steps 545 or 580, a check is made to determine whether the display element being overwritten is a transformed display element, and if so the relevant record for that display element is removed from the storage 272.

When employing the technique described with reference to FIG. 6, it will be appreciated that the truth table is as given in Table 3 below, assuming secure data confidentiality and integrity are required:

TABLE 3

| Access Type | Existing Pixel Security Setting | Action |
| --- | --- | --- |
| Secure Read | Any | Return data unmodified. |
| Secure Write | Any | Write data unmodified. (The secure/non-secure state implied by the data value written is honoured.) |
| Non-Secure Read | any non-secure colour value | Return data unmodified, or transform data to client form† and return. |

TABLE 3-continued

| Access Type | Existing Pixel Security Setting | Action |
| --- | --- | --- |
| Non-Secure Write | any non-secure colour value | Transform data from client form† to non-secure values, or optionally transform* data to a non-secure value, and write. |
| Non-Secure Read | any secure colour value | Abort, or return a dummy (non-secure) value. |
| Non-Secure Write | any secure colour value | Abort, or fail silently. |

†For the convenience of agents operating in the non-secure domain, the reservation of part of the full set of colour values for secure use could be disguised, using a transformation which maps values from the full abstract colourspace ('client form') to the restricted non-secure colourspace, and vice-versa. Note that because the non-secure colourspace necessarily contains fewer values than the abstract client colourspace, there is in general no guarantee that data read back by a non-secure access will match the data written exactly. The agent would be required to function correctly in the presence of such behaviour.
*If not using an abstract 'client form' of the colourspace for non-secure masters, then those masters can specify secure or non-secure values when writing. If maintaining the integrity of secure pixels is not required, then no transformation is required here; a non-secure master will be able to destroy secure data, but will be unable to read secure data stored by other masters (or itself). There is no way for a non-secure master to 'convert' secure data stored in the frame buffer into a non-secure form and hence read it. Conversely, if preservation of the integrity of secure data is required, then the data written by a non-secure master must be mapped to a non-secure value before being stored in the frame buffer memory. Additionally, to ensure the integrity constraint, any data written by the non-secure master must not be allowed to overwrite secure data.

It should be noted that the display controller is not just a simple digital to analogue converter (DAC) in this scenario, but various implementation strategies are possible. For example, typically rarely used colour encodings would be reserved as secure, to minimize the chance that the transform is actually needed for a given pixel. However, rarely used colours are not likely to be in the visually appealing colour range. To provide secure processes with a sensible set of colours the interface logic could be provided with a palette of colours (configurable by secure accesses only) which enable a translation of the actual colour used by the secure software into the "rare" colour encoding that is actually used to store the data in the frame buffer. The display controller would in such embodiments also be provided with the palette of colours to enable it to translate from the rare colour back to the originally specified colour prior to display.

In both the embodiments described above with reference to FIGS. 4 and 6, there is the option that the system designer only cares about data confidentiality (i.e. there is a need to stop non-secure reads to secure display elements), but does not care about data integrity, and hence a non-secure process can overwrite secure display elements. As an example of an implementation where this may be an acceptable approach, considering secure video decode, as long as a hacker cannot read back the secure content, it does not necessarily matter if that hacker overdraws the video with bad data, as it is merely their viewing that suffers, and the valuable content is not compromised. Additionally, as mentioned earlier, in many applications, such non-secure overwriting of secure data may be a required feature, for example to allow non-trusted software to place information overlays over a video. Considering the earlier discussed Table 1, if the above situation is the case, then the truth table is modified to become the truth table shown below as Table 4:

TABLE 4

| Access Type | Existing Pixel Security Setting | Action |
| --- | --- | --- |
| Secure Read | Non-Secure | Return Data |
| Secure Write | Non-Secure | Write Data, Pixel Security = Secure |
| Secure Read | Secure | Return Data |
| Secure Write | Secure | Write Data, Pixel Security = |

TABLE 4-continued

| Access Type | Existing Pixel Security Setting | Action |
|---|---|---|
| Non-Secure Read | Non-Secure | Secure (unchanged) Return Data |
| Non-Secure Write | Non-Secure | Write Data, Pixel Security = Non-Secure (unchanged) |
| Non-Secure Read | Secure | Abort/Return Dummy Value |
| Non-Secure Write | Secure | Write Data, Pixel Security = Non-Secure |

Similar modifications could be made to the earlier truth tables of Table 2 or Table 3 to show that for non-secure writes to secure locations the write is allowed to proceed rather than to fail, but with the pixel security being set to non-secure.

Figure 7:
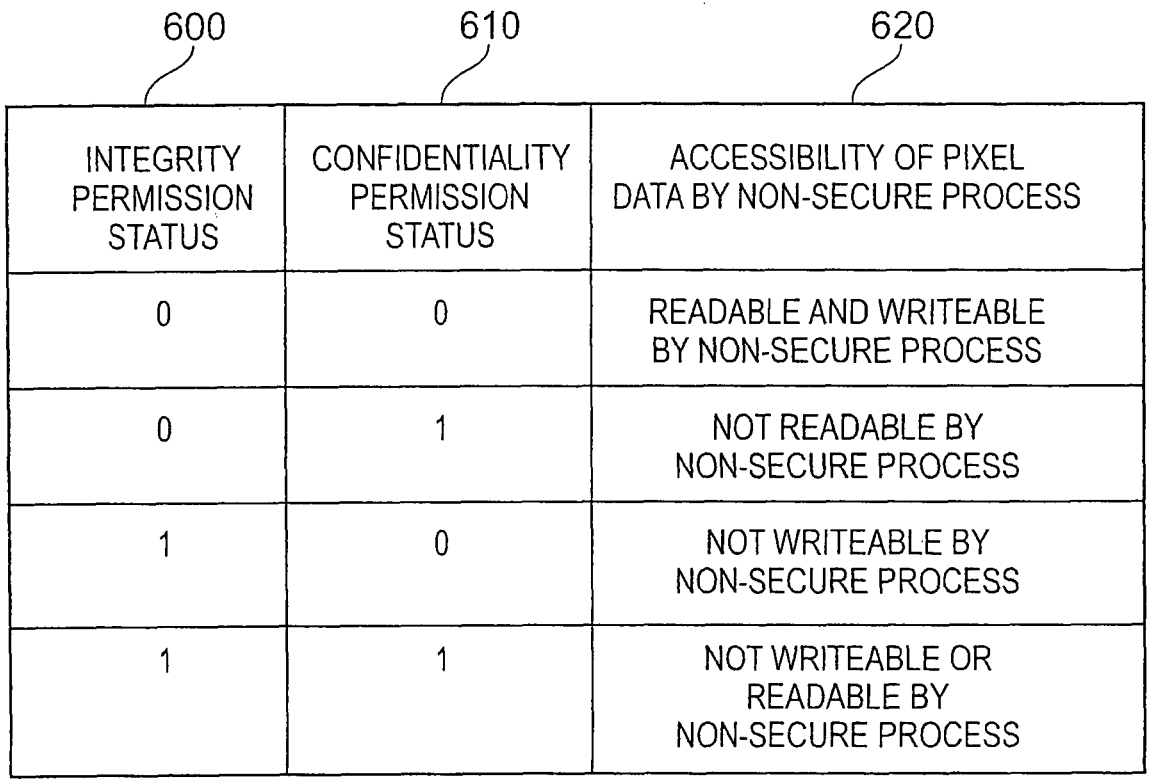
FIG. 7 is a table illustrating an embodiment where the security permission indication associated with each display element has separate integrity and confidentiality indications in accordance with one example embodiment.

As an extension/generalisation of the above described concepts, it would be possible to extend the security permission indication information so as to allow further protection/permissions control information to be associated with each display element, for example each pixel. As a particular example, it would be possible to specify separate security bits for read and write accesses, which can enable the confidentiality and/or integrity requirements for the secure data to be specified on a per display element basis. FIG. 7 illustrates such an approach where an integrity permission status bit 600 and a confidentiality permission status bit 610 are provided to form the security permission indication. The effects of the values given to these two bits on the accessibility of the pixel data by a non-secure process is illustrated by column 620 of FIG. 7. Accordingly, if both bits have a logic 0 value then this will indicate to the interface logic 40 that the non-secure process can both read and write to the associated location. In contrast, if both bits are set to a logic 1 value, this indicates to the interface logic that a non-secure process cannot write to or read from the associated location, i.e. secure data confidentiality and integrity is required. Alternatively, if only the integrity permission status bit 600 is set to a logic 1 value and the confidentiality permission status bit 610 is set to a logic 0 value this indicates that integrity only is required, and accordingly the associated display element should not be overwritten by a non-secure process. Conversely, if the integrity permission status bit 600 is not set and the confidentiality permission status bit 610 is set, then this indicates that confidentiality only is required, and accordingly the associated display element should not be readable by a non-secure process. It will be appreciated that in an alternative embodiment, the meanings associated with logic 0 values and logic 1 values may be reversed.

A potential use case for such an embodiment is as follows. Consider a situation where two secure windows are provided on an otherwise non-secure display. One secure window requires confidentiality (i.e. no non-secure reads to the display elements in that window), but non-secure overlay (i.e. non-secure writes to display elements in that window are allowed). The other secure window requires integrity and to keep screen-dumping working, so as to perform financial transactions (hence non-secure read access should be allowed, but no non-secure write accesses should take place).

As an additional feature, further security control information can be provided to identify what secure processes are allowed access to the secure display elements stored in the display buffer 30. This information may be included as additional security permission indication information for each display element, or could be specified globally via control information in one of the control registers 230. As an example, in a system there may be many secure processes running, and it may be appropriate to restrict read and write access to the frame buffer to only a subset of those secure processes. By identifying that subset as control information, the interface logic can perform an additional check when receiving an access from a secure process to check that the secure process is actually an authorised secure process. If the secure process is, then the process will proceed as normal, whereas if it is not the access can either fail, or instead the interface logic may be arranged to treat that access as if it were a non-secure access and take whatever actions are required dependent thereon.

Figure 8:
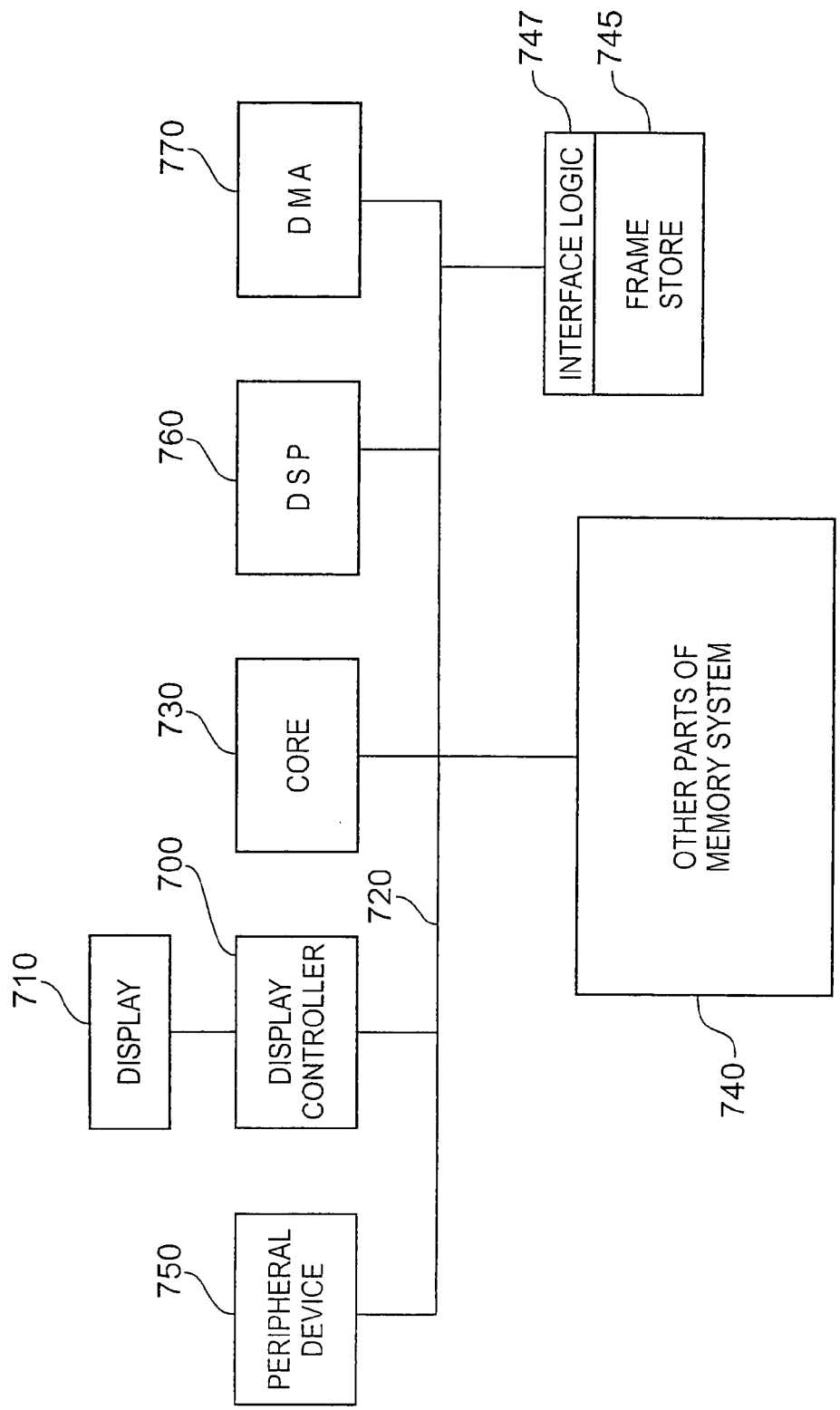
FIG. 8 is a block diagram illustrating a data processing apparatus in which the techniques of example embodiments may be employed.

FIG. 8 is a block diagram schematically illustrating a suitable data processing apparatus in which example embodiments may be employed. The data processing apparatus will typically include a number of devices which can access data stored within a memory system, the memory system including a frame store, also referred to herein as a display buffer 745, and various other memory devices, which are indicated by element 740 in FIG. 8. The various devices access the memory system via one or more memory buses 720. The devices that may access the memory system may include one or more processor cores 730, a digital signal processor (DSP) 760, a direct memory access (DMA) controller 770, a display controller 700 connected to a display 710, or some other peripheral device 750. The display controller 700 may include a DMA controller for accessing the frame store 745 via the one or more memory buses 720 and the interface logic 747 associated with the frame store 745, in order to retrieve the data required to form each frame of display data for output on the display 710.

In the embodiment illustrated in FIG. 8, it is envisaged that the processor core 730 would run the necessary non-secure and secure processes required to produce the non-secure data and secure data for storing in the frame store 745. Since both the secure process and the non-secure process can directly write to the frame store, no separate merging process is required, and the secure process can hence store secure data in the frame store 745 without there being a risk of the data being tampered with prior to storage in the frame store 745.

From the above description, it will be appreciated that example embodiments provide an improved technique for managing access to a display buffer used to produce display data for output on a securable display. The security of secure display elements being stored in the frame store can be effectively managed, whilst only requiring a single frame store to be provided, thereby significantly reducing the memory requirements compared with a system requiring separate secure and non-secure frame stores. As a result, such a system requires less silicon area, and also results in power savings.

Although particular example embodiments have been described herein, it will be appreciated that the claims are not limited thereto and that many modifications and additions thereto may be made within the scope of the claims.

We claim:

1. A data processing apparatus, comprising:
a display buffer for storing an array of display elements for subsequent output to a display controller, the display elements within the array comprising both secure display elements and non-secure display elements, and each display element having a security permission indication associated therewith identifying whether that display element is one of said secure display elements or one of said non-secure display elements;
at least one processing unit for executing a non-secure process and a secure process, each process issuing access requests when seeking to access display elements in the display buffer, each access request specifying a location in said display buffer; and interface logic associated with the display buffer for receiving each access request, and configured for at least each access request issued by the non-secure process to determine the security permission indication associated with the display element currently stored at the location specified by that access request, and to determine how that access request should be processed dependent on the determined security permission indication.

2. A data processing apparatus as claimed in claim 1, wherein the interface logic has access to control information identifying whether read accesses, write accesses, or read and write accesses to secure display elements from the non-secure process should be prevented, and references the control information when determining how an access request from the non-secure process should be processed if the determined security permission indication identifies the currently stored display element as a secure display element.

3. A data processing apparatus as claimed in claim 2, further comprising at least one control register accessible by the interface logic and arranged to store said control information, the control register being programmable by a secure setting routine executed by said at least one processing unit.

4. A data processing apparatus as claimed in claim 1, wherein said security permission indication identifies a first security indication for read accesses and a second security indication for write accesses.

5. A data processing apparatus as claimed in claim 1, wherein for a write access request issued by the secure process specifying a new display element, the interface logic is operable to apply predetermined criteria to determine the security permission indication to be associated with the new display element when stored in the display buffer.

6. A data processing apparatus as claimed in claim 5, wherein an otherwise unused field in the new display element is used by the secure process to specify the required security permission indication and the interface logic is operable to cause the security permission indication to be set in accordance with that otherwise unused field.

7. A data processing apparatus as claimed in claim 5, further comprising at least one control register accessible by the interface logic and arranged to identify the security permission indication to be used for the new display element, the control register being programmable by a secure setting routine executed by said at least one processing unit.

8. A data processing apparatus as claimed in claim 5, wherein the secure process has a plurality of access mechanisms by which access requests can be issued to the display buffer, the interface logic being operable to determine the security permission indication to be associated with the new display element when stored in the display buffer dependent on the access mechanism used by the secure process.

9. A data processing apparatus as claimed in claim 8, wherein the plurality of access mechanisms comprise different ports to which the access request can be issued.

10. A data processing apparatus as claimed in claim 8, wherein the plurality of access mechanisms comprise different address range aliases that can be used to specify locations in the display buffer.

11. A data processing apparatus as claimed in claim 1, wherein the security permission indication is stored separately to each display element.

12. A data processing apparatus as claimed in claim 11, wherein a separate security permission indication is stored for each display element.

13. A data processing apparatus as claimed in claim 1, wherein a range of values are available for the display elements, and a subset of values in said range are reserved for secure display elements when stored within the display buffer, whereby the security permission indication for each display element stored in the display buffer is directly indicated by the display element value.

14. A data processing apparatus as claimed in claim 13, wherein the interface logic comprises display element transform logic operable for at least each write access request issued by the non-secure process to selectively perform a transform on the display element in order to produce a transformed display element to be written to the display buffer in response to that write access request, so as to ensure that the write access request results in a non-secure display element being written in the display buffer.

15. A data processing apparatus as claimed in claim 14, further comprising a storage for keeping a record of each transform performed, the interface logic further being operable, for at least a read access request issued by the non-secure process to a location storing a transformed display element, to reference the storage in order to generate an untransformed display element for returning to the process that issued the read access request, so as to mask from the non-secure process the fact that said subset of values in said range are reserved for secure display elements.

16. A data processing apparatus as claimed in claim 15, wherein the interface logic is operable to update said storage following a write access request to a location whose current display element is a transformed display element.

17. A data processing apparatus as claimed in claim 13, wherein the subset of values in said range that are reserved for storing secure display elements in the display buffer are a subset of rarely used colours, and the interface logic comprises translation logic, responsive to a write access request issued by the secure process specifying a colour outside said subset, to perform a translation operation to translate the specified colour to a colour within said subset.

18. A data processing apparatus as claimed in claim 1, wherein the interface logic is arranged to allow write access requests issued by the non-secure process to overwrite secure display elements, but is arranged to prevent read access requests issued by the non-secure process from reading secure display elements.

19. A data processing apparatus as claimed in claim 1, wherein each display element is a pixel value.

20. A method of managing access to a display buffer in a data processing apparatus, the display buffer storing an array of display elements for subsequent output to a display controller, the display elements within the array comprising both secure display elements and non-secure display elements, and the method comprising the steps of:

associating a security permission indication with each display element stored in the buffer, identifying whether that display element is one of said secure display elements or one of said non-secure display elements;

executing a non-secure process and a secure process, each process issuing access requests when seeking to access display elements in the display buffer, each access request specifying a location in said display buffer; and for at least each access request issued by the non-secure process, determining the security permission indication associated with the display element currently stored at the location specified by that access request, and determining how that access request should be processed dependent on the determined security permission indication.

\* \* \* \* \*